United States Patent
Fukuoka et al.

(10) Patent No.: US 7,358,011 B2
(45) Date of Patent: Apr. 15, 2008

(54) NON-AQUEOUS ELECTROLYTE SECONDARY BATTERY NEGATIVE ELECTRODE MATERIAL, MAKING METHOD, AND LITHIUM ION SECONDARY BATTERY

(75) Inventors: Hirofumi Fukuoka, Gunma-ken (JP); Mikio Aramata, Gunma-ken (JP); Satoru Miyawaki, Gunma-ken (JP); Susumu Ueno, Takefu (JP); Kazuma Momii, Gunma-ken (JP)

(73) Assignee: Shin-Etsu Chemical Co., Ltd, Tokyo (JP)

(*) Notice: Subject to any disclaimer, the term of this patent is extended or adjusted under 35 U.S.C. 154(b) by 713 days.

(21) Appl. No.: 10/721,280

(22) Filed: Nov. 26, 2003

(65) Prior Publication Data

US 2004/0106040 A1    Jun. 3, 2004

(30) Foreign Application Priority Data

Nov. 26, 2002    (JP)    ............................. 2002-342624

(51) Int. Cl.
*H01M 4/62* (2006.01)

(52) U.S. Cl. ...................... 429/232; 429/212; 429/128; 429/209; 429/218.1

(58) Field of Classification Search ............... 429/232, 429/212, 128, 209, 218.1
See application file for complete search history.

(56) References Cited

U.S. PATENT DOCUMENTS

| 5,395,711 | A | 3/1995 | Tahara et al. |
| 5,478,671 | A | 12/1995 | Idota |
| 6,066,414 | A | 5/2000 | Imoto et al. |
| 6,383,686 | B1 | 5/2002 | Umeno et al. |
| 6,733,922 | B2 * | 5/2004 | Matsubara et al. ......... 429/232 |

FOREIGN PATENT DOCUMENTS

| EP | 1 032 062 A1 | | 8/2000 |
| JP | 5-174818 A | | 7/1993 |
| JP | 6-60867 A | | 3/1994 |
| JP | 63-325765 A | | 11/1994 |
| JP | 10-294112 A | | 11/1998 |
| JP | 11-102705 A | | 4/1999 |
| JP | 2000-215887 A | | 8/2000 |
| JP | 2000-243396 A | | 9/2000 |
| JP | 2001-216961 | * | 8/2001 |
| JP | 2002-42806 A | | 2/2002 |
| JP | 2002-373653 | * | 12/2002 |

* cited by examiner

*Primary Examiner*—Laura Weiner
(74) *Attorney, Agent, or Firm*—Birch, Stewart, Kolasch & Birch, LLP

(57) ABSTRACT

A non-aqueous electrolyte secondary battery negative electrode material is provided wherein a negative electrode active material containing a lithium ion-occluding and releasing material which has been treated with an organo-silicon base surface treating agent is surface coated with a conductive coating. Using the negative electrode material, a lithium ion secondary battery having a high capacity and improved cycle performance is obtainable.

7 Claims, No Drawings

NON-AQUEOUS ELECTROLYTE SECONDARY BATTERY NEGATIVE ELECTRODE MATERIAL, MAKING METHOD, AND LITHIUM ION SECONDARY BATTERY

This Nonprovisional application claims priority under 35 U.S.C. § 119(a) on Patent Application No(s). 2002-342624 filed in Japan on Nov. 26, 2002, the entire contents of which are hereby incorporated by reference.

BACKGROUND OF THE INVENTION

1. Field of the Invention

This invention relates to a non-aqueous electrolyte secondary battery negative electrode material which exhibits a high charge/discharge capacity and satisfactory cycle performance when used as the negative electrode active material in lithium ion secondary batteries, a method for preparing the same, and a lithium ion secondary battery. Throughout the specification, the term "conductive" or "conductivity" refers to electrically conductive or electric conductivity.

2. Background Art

With the recent remarkable development of potable electronic equipment, communications equipment and the like, a strong demand for high energy density secondary batteries exists from the standpoints of economy and size and weight reductions. One prior art method for increasing the capacity of secondary batteries is to use oxides as the negative electrode material, for example, oxides of V, Si, B, Zr, Sn or the like or complex oxides thereof (see JP-A 5-174818 and JP-A 6-060867 corresponding to U.S. Pat. No. 5,478,671), metal oxides quenched from the melt (JP-A 10-294112), silicon oxide (Japanese Patent No. 2,997,741 corresponding to U.S. Pat. No. 5,395,711), and $Si_2N_2O$ and $Ge_2N_2O$ (JP-A 11-102705 corresponding to U.S. Pat. No. 6,066,414). Conventional methods of imparting conductivity to the negative electrode material include mechanical alloying of SiO with graphite, followed by carbonization (see JP-A 2000-243396 corresponding to EP 1032062), coating of silicon particles with a carbon layer by chemical vapor deposition (JP-A 2000-215887 corresponding to U.S. Pat. No. 6,383,686), and coating of silicon oxide particles with a carbon layer by chemical vapor deposition (JP-A 2002-42806).

These prior art methods are successful in increasing the charge/discharge capacity and energy density, but are not necessarily satisfactory because of insufficient cycle performance and failure to fully meet the characteristics required in the market. There is a desire for further improvement in energy density.

In particular, Japanese Patent No. 2,997,741 uses silicon oxide as the negative electrode material in a lithium ion secondary battery to provide an electrode with a high capacity. As long as the present inventors have confirmed, there is left a room for further improvement as demonstrated by a still high irreversible capacity on the first charge/discharge cycle and cycle performance below the practical level. With respect to the technique of imparting conductivity to the negative electrode material, JP-A 2000-243396 suffers from the problem that solid-to-solid fusion fails to form a uniform carbon coating, resulting in insufficient conductivity. In the method of JP-A 2000-215887 which can form a uniform carbon coating, the negative electrode material based on silicon undergoes excessive expansion and contraction upon adsorption and desorption of lithium ions, and is thus impractical. Since the cycle performance lowers, the charge/discharge quantity must be limited in order to prevent the cycle performance from degrading. In JP-A 2002-42806, despite a discernible improvement of cycle performance, due to precipitation of silicon crystallites, insufficient structure of the carbon coating and insufficient fusion of the carbon coating to the substrate, the capacity gradually lowers as charge/discharge cycles are repeated, and suddenly drops after a certain number of charge/discharge cycles. This approach is thus insufficient for use in secondary batteries.

SUMMARY OF THE INVENTION

An object of the present invention is to provide a non-aqueous electrolyte secondary battery negative electrode material from which a negative electrode having improved cycle performance for lithium ion secondary batteries can be prepared, a method for preparing the same, and a lithium ion secondary battery.

Making extensive investigations on Si, a composite dispersion of Si and $SiO_2$, and a silicon oxide represented by the general formula $SiO_x$ wherein $1.0 \leq x < 1.6$, all having a large theoretical capacity per unit volume, as a base, the inventors have discovered a negative electrode material having better cycle performance than the above-described prior art materials.

The development of an electrode material having an increased charge/discharge capacity is very important and many engineers have been engaged in the research and development thereof. Under the circumstances, silicon and silicon oxide represented by the general formula $SiO_x$ wherein $1.0 \leq x < 1.6$ are of great interest as the negative electrode active material for lithium ion secondary batteries because their capacity is large. Their shortcoming is substantial degradation upon repeated charge/discharge cycles, that is, poor cycle performance. As to the means for improving the cycle performance, it is confirmed that the cycle performance is significantly improved over the prior art by the method of subjecting silicon particles to chemical vapor deposition as disclosed in JP-A 2000-215887. However, the extent of improvement thereby is still short to satisfy the performance required in the market.

Studying the cause of cycle degradation, the inventors have found that the cycle performance degrades because the negative electrode material is disrupted through expansion and contraction taking place upon occlusion and release of lithium ions, so that the electrode lowers its conductivity. Searching for the means of preventing any loss of conductivity owing to disruption of the negative electrode material, the inventors have found that by treating silicon, a composite dispersion of silicon and silicon dioxide, or a silicon oxide represented by the general formula $SiO_x$ wherein $1.0 \leq x < 1.6$, with an organosilicon base surface treating agent and coating the treated material with a conductive coating, there is obtained a negative electrode material which has a strong binding force sufficient to prevent disruption as well as a high conductivity. Using this negative electrode material, a lithium ion secondary battery experiencing little cycle degradation can be fabricated.

In a first aspect, the invention provides a negative electrode material for non-aqueous electrolyte secondary batteries, wherein a negative electrode active material containing a lithium ion-occluding and releasing material which has been treated with an organosilicon base surface treating agent is surface coated with a conductive coating.

The lithium ion-occluding and releasing material is typically silicon, a composite dispersion of silicon and silicon dioxide, a silicon oxide represented by the general formula $SiO_x$ wherein $1.0 \leq x < 1.6$, or a mixture thereof.

The organosilicon base surface treating agent is preferably a silane coupling agent or a (partial) hydrolytic condensate thereof, a silylating agent or a silicone resin, and more preferably a silane coupling agent of the general formula (1) or a (partial) hydrolytic condensate thereof, a silylating agent of the general formula (2) or a silicone resin of the general formula (3).

  (1)

  (2)

  (3)

Herein R is a monovalent organic group, Y is a hydrolyzable group or hydroxyl group, n is an integer of 1 to 4, p is an integer of 1 to 3, L is an integer of 2 to 4, and m is an integer of 1 to 3; $R^1$ is hydrogen or a substituted or unsubstituted monovalent hydrocarbon group of 1 to 10 carbon atoms, $R^2$ is hydrogen or a substituted or unsubstituted monovalent hydrocarbon group of 1 to 6 carbon atoms, q is a number of 0 to 2.5, r is a number from 0.01 to 3, satisfying $0.5 \leq q+r \leq 3$.

Most often, the conductive coating is a carbon coating. The amount of carbon coated is preferably 5 to 70% by weight of the negative electrode active material.

In a second aspect, the invention provides a method of preparing a negative electrode material for non-aqueous electrolyte secondary batteries, comprising the step of heat treating a negative electrode active material containing a lithium ion-occluding and releasing material which has been treated with an organosilicon base surface treating agent, in an atmosphere containing an organic material gas or vapor at a temperature in the range of 500 to 1400° C. Preferably, the organic material gas or vapor is thermally decomposed to form graphite in a non-oxidizing atmosphere at a temperature in the range of 500 to 1400° C.

In a third aspect, the invention provides a lithium ion secondary battery comprising the negative electrode material as a negative electrode active material.

DESCRIPTION OF THE PREFERRED EMBODIMENTS

The lithium ion-occluding and releasing materials used herein include silicon-base substances such as metallic silicon and lower oxides of silicon (generally referred to as silicon oxide), typically silicon (Si), a composite dispersion of silicon (Si) and silicon dioxide ($SiO_2$), and $SiO_x$ wherein $1.0 \leq x < 1.6$;

silicon-free metal oxides represented by the formula: $MO_a$ wherein M is at least one metal selected from among Ge, Sn, Pb, Bi, Sb, Zn, In and Mg and "a" is a positive number of 0.1 to 4; and lithium complex oxides (which may contain silicon) represented by the formula: $LiM_bO_c$ wherein M is at least one metal selected from among Ge, Sn, Pb, Bi, Sb, Zn, In, Mg and Si, b is a positive number of 0.1 to 4, and c is a positive number of 0.1 to 8.

Specific examples include $GeO$, $GeO_2$, $SnO$, $SnO_2$, $Sn_2O_3$, $Bi_2O_3$, $Bi_2O_5$, $Sb_2O_3$, $Sb_2O_4$, $Sb_2O_5$, $ZnO$, $In_2O$, $InO$, $In_2O_3$, $MgO$, $Li_2SiO_3$, $Li_4SiO_4$, $Li_2Si_3O_7$, $Li_2Si_2O_5$, $Li_8SiO_6$, $Li_6Si_2O_7$, $Li_4Ge_9O_7$, $Li_4Ge_9O_2$, $Li_5Ge_8O_{19}$, $Li_4Ge_5O_{12}$, $Li_5Ge_2O_7$, $Li_4GeO_4$, $Li_2Ge_7O_{15}$, $Li_2GeO_3$, $Li_2Ge_4O_9$, $Li_2SnO_3$, $Li_8SnO_6$, $Li_2PbO_3$, $Li_7SbO_5$, $LiSbO_3$, $Li_3SbO_4$, $Li_3BiO_5$, $Li_6BiO_6$, $LiBiO_2$, $Li_4Bi_6O_{11}$, $Li_6ZnO_4$, $Li_4ZnO_3$, $Li_2ZnO_2$, $LiInO_2$, $Li_3InO_3$, and analogous non-stoichiometric compounds. The invention becomes more effective when metallic silicon (Si) and silicon oxides having a high theoretical charge/discharge capacity are used.

No particular limits are imposed on the physical properties of silicon and silicon oxides. Preferably they are in the form of particles having an average particle size of about 0.01 to 50 μm, especially about 0.1 to 10 μm. Metallic silicon (Si) may take the form of composite dispersion particles having an average particle size of about 0.01 to 50 μm, especially about 0.1 to 10 μm in which crystallites having an average particle size of about 1 to 500 nm, especially about 2 to 200 nm are dispersed in a crystalline or amorphous silicon compound such as silicon dioxide ($SiO_2$). If the average particle size of silicon and silicon oxide particles is less than 0.01 μm, purity lowers owing to surface oxidation and on use as the lithium ion secondary battery negative electrode material, there may result a lowering of charge/discharge capacity, a lowering of bulk density, and a lowering of charge/discharge capacity per unit volume. If the average particle size of silicon and silicon oxide particles is more than 50 μm, the amount of graphite precipitated thereon during chemical vapor deposition treatment may be reduced, which may eventually lead to cycle performance lowering on use as the lithium ion secondary battery negative electrode material.

It is noted that the average particle size can be determined as the weight average particle size in a particle size distribution as measured by the laser light diffraction method.

The characteristic feature of the present invention is to treat the lithium ion-occluding and releasing material with an organosilicon base surface treating agent. Although the type of organosilicon base surface treating agent is not critical, use is preferably made of a silane coupling agent or a (partial) hydrolytic condensate thereof, a silylating agent, and a silicone resin, alone or in admixture of any. The term "(partial) hydrolytic condensate" as used herein means that it may be either a partial hydrolytic condensate of a silane coupling agent or a hydrolytic condensate of a silane coupling agent which has been fully hydrolyzed and condensed.

Typical silane coupling agents are of the general formula (1) and typical silylating agents are of the general formula (2), shown below.

  (1)

  (2)

Herein R is a monovalent organic group, Y is a hydrolyzable group or hydroxyl group, n is an integer of 1 to 4, p is an integer of 1 to 3, L is an integer of 2 to 4, and m is an integer of 1 to 3.

The monovalent organic groups represented by R include unsubstituted monovalent hydrocarbon groups of 1 to 12 carbon atoms, especially 1 to 10 carbon atoms, such as alkyl, cycloalkyl, alkenyl, aryl and aralkyl groups; substituted monovalent hydrocarbon groups in which some or all of the hydrogen atoms on the foregoing hydrocarbon groups are substituted with halogen atoms (e.g., chloro, fluoro, bromo), cyano groups, oxyalkylene groups (e.g., oxyethylene), polyoxyalkylene groups (e.g., polyoxyethylene), or functional groups such as (meth)acrylic groups, (meth)acryloxy groups, acryloyl groups, methacryloyl groups, mercapto groups, amino groups, amide groups, ureido groups, and epoxy groups; and such substituted or unsubstituted monovalent hydrocarbon groups which are separated by an oxygen atom, NH group, $NCH_3$ group, $NC_6H_5$ group, $C_6H_5NH-$ group, $H_2NCH_2CH_2NH-$ group or the like.

Illustrative examples of R include alkyl groups such as $CH_3-$, $CH_3CH_2-$, and $CH_3CH_2CH_2-$, alkenyl groups such as $CH_2=CH-$, $CH_2=CHCH_2-$, and $CH_2=C(CH_3)-$, aryl groups such as $C_6H_5-$, and $ClCH_2-$, $ClCH_2CH_2CH_2-$, $CF_3CH_2CH_2-$, $NCCH_2CH_2-$, $CH_3-(CH_2CH_2O)_s-CH_2CH_2CH_2-$, $CH_2(O)CHCH_2OCH_2CH_2CH_2-$ wherein $CH_2(O)CHCH_2$ is glycidyl, $CH_2=CHCOOCH_2-$,

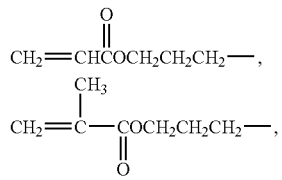

$HSCH_2CH_2CH_2-$, $NH_2CH_2CH_2CH_2-$, $NH_2CH_2CH_2NHCH_2CH_2CH_2-$, and $NH_2CONHCH_2CH_2CH_2-$. Of these groups of R, preferred are γ-glycidyloxypropyl, β-(3,4-epoxycyclohexyl)ethyl, γ-aminopropyl, γ-cyanopropyl, γ-acryloxypropyl, γ-methacryloxypropyl and γ-ureidopropyl.

The hydrolyzable groups represented by Y include alkoxy groups such as $-OCH_3$ and $-OCH_2CH_3$, amino groups such as $-NH_2$, $-NH-$, $-N=$ and $-N(CH_3)_2$, $-Cl$, oximino groups such as $-ON=C(CH_3)CH_2CH_3$, aminoxy groups such as $-ON(CH_3)_2$, carboxyl groups such as $-OCOCH_3$, alkenyloxy groups such as $-OC(CH_3)=CH_2$, $-CH(CH_3)-COOCH_3$, $-C(CH_3)_2-COOCH_3$, etc. The groups of Y may be the same or different. Of these groups of Y, preferred are alkoxy groups such as methoxy and ethoxy, alkenyloxy groups such as isopropenyloxy, imide residues ($-NH-$), substituted or unsubstituted acetamide residues, urea residues, carbamate residues, sulfamate residues and hydroxyl groups.

The subscript s is an integer of 1 to 3, preferably 2 or 3, more preferably 3; and n is an integer of 1 to 4, preferably 3 or 4.

Illustrative examples of silane coupling agents of formula (1) include methyltrimethoxysilane, tetraethoxysilane, vinyltrimethoxysilane, methylvinyldimethoxysilane, γ-aminopropyltriethoxysilane, γ-mercaptopropyltrimethoxysilane, γ-cyanopropyltrimethoxysilane, N-β-(aminoethyl)-γ-aminopropyltrimethoxysilane, γ-methacryloxypropyltrimethoxysilane, γ-glycidyloxypropyltrimethoxysilane, β-(3,4-epoxycyclohexyl)ethyltrimethoxysilane, and γ-ureidopropyltrimethoxysilane. The silane coupling agents may be used alone or in admixture of two or more. They may be hydrolytic condensates and/or partial hydrolytic condensates.

Illustrative examples of silylating agents of formula (2) include organosilazanes such as hexamethyldisilazane, divinyltetramethyldisilazane, tetravinyldimethyldisilazane, and octamethyltrisilazane, and N,O-bis(trimethylsilyl)acetamide, N,O-bis(trimethylsilyl)carbamate, N,O-bis(trimethylsilyl)sulfamate, N,O-bis(trimethylsilyl)trifluoroacetamide, and N,N'-bis(trimethylsilyl)urea.

Also useful as the organosilicon base surface treating agent is a silicone resin, that is, organopolysiloxane of straight, branched or cyclic or three-dimensional network structure containing in a molecule at least one, preferably at least two $OR^2$ groups wherein $R^2$ is defined below. A typical silicone resin has the general formula (3):

 (3)

wherein $R^1$ is hydrogen or a substituted or unsubstituted monovalent hydrocarbon group of 1 to 10 carbon atoms, $R^2$ is hydrogen or a substituted or unsubstituted monovalent hydrocarbon group of 1 to 6 carbon atoms, q and r each are 0 or a positive number satisfying $0 \leq q \leq 2.5$, $0.01 \leq r \leq 3$, and $0.5 \leq q+r \leq 3$.

Examples of the monovalent hydrocarbon groups represented by $R^1$ or $R^2$ include those groups exemplified for R which have 1 to 10 carbon atoms or 1 to 6 carbon atoms, such as alkyl, aryl and alkenyl groups. $R^1$ is preferably methyl, ethyl, vinyl or phenyl, and $R^2$ is preferably hydrogen, methyl, ethyl or isopropyl. The subscript q is preferably in the range $0 \leq q \leq 2$, more preferably $0.3 \leq q < 1.5$; r is preferably in the range $0.1 \leq r \leq 2$, more preferably $0.3 \leq r < 1.2$, and the sum of q+r is preferably in the range $0.5 \leq q+r \leq 2.1$, more preferably $0.8 \leq q+r \leq 1.8$.

Although the amount of the organosilicon base surface treating agent used is not critical, the preferred amount is 0.01 to 20 parts by weight per 100 parts by weight of the base or lithium ion-occluding and releasing material. This amount depends on the type of silane coupling agent used and the specific surface area of the base or lithium ion-occluding and releasing material. It is preferred to use the organosilicon base surface treating agent in a relatively large amount when the silane coupling agent used has a higher molecular weight, and also in a relatively large amount when the lithium ion-occluding and releasing material used has a large specific surface area.

Any desired method may be used in treating the lithium ion-occluding and releasing material with the organosilicon base surface treating agent. One exemplary method using a silane coupling agent involves dissolving the silane coupling agent in water to form a thin aqueous solution, adding the lithium ion-occluding and releasing material to the solution, and mixing them, followed by filtration and drying. In this method, a hydrolysis-promoting catalyst such as $CH_3COOH$, $NH_3$, tetraisopropoxytitanium, dibutyltin dilaurate, or tin dioctylate may be added in an adequate amount, if desired, for promoting hydrolysis of the silane coupling agent. An alternative method involves preparing a relatively thick aqueous solution of the silane coupling agent, adding the aqueous solution to an organic solvent such as methanol to form a treating solution, adding the lithium ion-occluding and releasing material to the treating solution, and mixing them, followed by filtration and drying.

The negative electrode material for non-aqueous electrolyte secondary batteries according to the invention is arrived at by coating surfaces of a negative electrode active material containing the lithium ion-occluding and releasing material which has been treated with the organosilicon base surface treating agent, with a conductive coating. The conductive coating may be made of a conductive material which does not decompose or alter in a battery constructed using the negative electrode material. Useful conductive coatings include metal coatings such as Al, Ti, Fe, Ni, Cu, Zn, Ag and Sn and carbon coatings. Of these, carbon coatings are preferred for ease of application and a high conductivity.

Any desired method may be employed in forming the conductive coating. For example, plating, mechanical alloying, and chemical vapor deposition methods are useful. Of these, chemical vapor deposition is preferred because a uniform conductive coating can be formed.

The base material (negative electrode active material) subject to conductive coating treatment may consist of the lithium ion-occluding and releasing material which has been treated with the organosilicon base surface treating agent, or a mixture of the lithium ion-occluding and releasing material which has been treated with the organosilicon base surface treating agent and a conductive material (typically graphite powder) which is added for enhancing conductivity.

Described below is the method of preparing a lithium ion secondary battery negative electrode material.

In the preferred method, the lithium ion secondary battery negative electrode material of the invention is prepared by heat treating surfaces of the negative electrode active material containing the lithium ion-occluding and releasing material which has been treated with the organosilicon base surface treating agent, in an atmosphere containing at least an organic material gas or vapor at a temperature in the range of 500° C. to 1400° C., more preferably 700° C. to 1300° C. If the heat treatment temperature is below 500° C., a conductive carbon coating may not form, or the heat treatment must be continued for a longer time and becomes inefficient. If the heat treatment temperature is above 1400° C., there is a possibility that particles coalesce and fuse together during the chemical vapor deposition treatment. No conductive coating is formed at the coalesced face. Then the cycle performance may lower on use of the lithium ion secondary battery negative electrode material. In the event silicon is used as the core, since such a high heat treatment temperature is approximate to the melting point of silicon, the silicon can be melted, interfering with coverage of surfaces of particles with conductive coatings.

The organic material capable of generating an organic material gas is selected from materials that are thermally decomposed at the above-described heat treatment temperature, especially in a non-oxidizing atmosphere, to form carbon or graphite. Suitable organic materials include hydrocarbons such as methane, ethane, ethylene, acetylene, propane, butane, butene, pentane, isobutane, and hexane, alone or mixtures, and mono- to tricyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene, alone or mixtures. Also, gas light oil resulting from tar distillation step, creosote oil, anthracene oil, or naphtha cracked tar oil may be used alone or in admixture.

The heat treatment of the lithium ion-occluding and releasing material and the organic material gas may be carried out in a non-oxidizing atmosphere using a reactor having a heating mechanism. Any desired reactor may be used as long as it is capable of continuous or batchwise treatment. A choice may be made in accordance with a particular purpose among a fluidized bed reaction furnace, a rotary kiln, a vertical moving bed reaction furnace, a tunnel kiln, and a batch furnace, for example.

The base material subject to chemical vapor deposition treatment may consist of the lithium ion-occluding and releasing material which has been treated with the organosilicon base surface treating agent, or a mixture of the lithium ion-occluding and releasing material which has been treated with the organosilicon base surface treating agent and graphite. In the latter, graphite is added for the purpose of enhancing conductivity.

The amount of carbon coated herein is preferably 5 to 70% by weight, especially 10 to 50% by weight of the base material (that is, the entire negative electrode active material consisting of the lithium ion-occluding and releasing material which has been treated with the organosilicon base surface treating agent, or a mixture of the lithium ion-occluding and releasing material which has been treated with the organosilicon base surface treating agent and a conductive material). If the carbon coating weight is less than 5% by weight, no substantial improvement in conductivity may be observed and the cycle performance may be insufficient on use of the lithium ion secondary battery negative electrode material. If the carbon coating weight is more than 70% by weight, the proportion of carbon becomes too high, with a risk of the negative electrode capacity lowering on use of the lithium ion secondary battery negative electrode material.

Using the non-aqueous electrolyte secondary battery negative electrode material thus obtained, a lithium ion secondary battery can be fabricated.

The lithium ion secondary battery thus fabricated is characterized by the use of the above-described negative electrode material. The battery further comprises a positive electrode, a negative electrode, an electrolyte and a separator while no particular limits are imposed on the materials of these components and the battery shape. For example, transition metal oxides and chalcogenides such as $LiCoO_2$, $LiNiO_2$, $LiMn_2O_4$, $V_2O_6$, $MnO_2$, $TiS_2$ and $MOS_2$ are used as the positive electrode active material. Suitable electrolytes are non-aqueous solutions of lithium salts such as lithium perchlorate in non-aqueous solvents such as propylene carbonate, ethylene carbonate, dimethoxyethane, γ-butyrolactone and 2-methyltetrahydrofuran, alone or in admixture of any. Other non-aqueous electrolytes and solid electrolytes are also useful.

When a negative electrode is prepared using the lithium ion secondary battery negative electrode material, a conductive agent such as graphite may be added to the lithium ion secondary battery negative electrode material. The type of conductive agent used herein is not critical. There may be used any of electronically conductive materials which do not decompose or alter in the battery, for example, metals in powder or fiber form such as Al, Ti, Fe, Ni, Cu, Zn, Ag, Sn and Si, natural graphite, artificial graphite, various coke powders, mesophase carbon, vapor phase grown carbon fibers, carbon fibers derived from pitch, carbon fibers derived from polyacrylonitrile (PAN), and graphite produced by firing various resins.

EXAMPLE

Examples of the invention are given below by way of illustration and not by way of limitation. Parts and percents are by weight.

Example 1

First, 100 pbw of vinyltrimethoxysilane (trade name KBM1003 by Shin-Etsu Chemical Co., Ltd.) as the silane coupling agent was dissolved in 100 pbw of methanol to form a 50% methanol solution. 200 pbw of the 50% methanol solution was dissolved in 100 pbw of deionized water to form an aqueous solution. Then 1 pbw of this aqueous solution was dissolved in 100 pbw of methanol to form a treating solution. To 100 pbw of the treating solution was added 100 pbw of a ceramics grade metallic silicon powder having an average particle size of 3.5 μm and a BET specific surface area of 4 $m^2/g$. They were mechanically agitated for 1 hour to achieve thorough mixing. The resulting slurry was then filtered and dried, obtaining the metallic silicon powder treated with the silane coupling agent. Next, the treated metallic silicon powder was placed in a rotary kiln where chemical vapor deposition was carried out in an $Ar/CH_4$ gas atmosphere at 1200° C., yielding a non-aqueous electrolyte secondary battery negative electrode material. The black powder thus obtained was a conductive powder having an average particle size of 4.2 μm, a BET specific surface area of 15.2 m²/g and a graphite coating weight of 22%.

Battery Test

A battery was fabricated using the conductive powder as a negative electrode active material, after which the battery was evaluated for performance.

Artificial graphite (average particle size 5 μm) was added to the conductive powder to form a mixture having a carbon content of 40%. The mixture was combined with 10% of polyvinylidene fluoride and then with N-methylpyrrolidone to form a slurry. The slurry was applied to a copper foil of 20 μm thick, dried at 120° C. for 1 hour, and press shaped into a plate by means of a roller press. The plate was punched into a disk having a diameter of 20 mm as a negative electrode.

To examine the charge/discharge characteristics of the negative electrode, a lithium ion secondary battery was fabricated using a lithium foil as the counter electrode, a non-aqueous electrolyte solution obtained by dissolving lithium hexafluorophosphate in a 1/1 (volume ratio) mixture of ethylene carbonate and 1,2-dimethoxyethane in a concentration of 1 mol/liter as the non-aqueous electrolyte, and a microporous polyethylene film of 30 μm thick as the separator.

The lithium ion secondary battery thus fabricated was held overnight at room temperature. Using a secondary battery charge/discharge tester (Nagano Co., Ltd.), a test was carried out by charging at a constant current of 1 mA until the test cell reached a voltage of 0 V, then charging at a reduced current so that the cell voltage was maintained at 0 V. The charging was terminated when the current value fell below 20 μA. Discharging was conducted at a constant current of 1 mA and terminated when the cell voltage rose above 1.8 V. A discharge capacity was determined.

The charge/discharge test was repeated 50 cycles, after which the charge/discharge test was carried out on the lithium ion secondary battery again. The lithium ion secondary battery had a 1st cycle charge capacity of 1386 mAh/g, a 1st cycle discharge capacity of 1275 mAh/g, a 1st cycle charge/discharge efficiency of 90%, a 50th cycle discharge capacity of 1020 mAh/g, and a cycle retentivity of 80% after 50 cycles, indicating a high capacity, an excellent 1st cycle charge/discharge efficiency and excellent cycle performance.

Example 2

A non-aqueous electrolyte secondary battery negative electrode material was prepared by the same procedure as in Example 1 except that a silicon oxide powder of $SiO_x$ (x=1.02) having an average particle size of 1.1 μm and a BET specific surface area of 10.3 m²/g was used as the base. The negative electrode material thus obtained was a conductive powder having an average particle size of 1.5 μm, a BET specific surface area of 20.3 m²/g and a graphite coating weight of 24%.

As in Example 1, a test battery was fabricated using this conductive powder and similarly tested. The lithium ion secondary battery had a 1st cycle charge/discharge capacity of 975 mAh/g, a 1st cycle discharge capacity of 780 mAh/g, a 1st cycle charge/discharge efficiency of 80%, a 50th cycle discharge capacity of 773 mAh/g, and a cycle retentivity of 99% after 50 cycles, indicating excellent cycle performance, despite a less capacity than in Example 1.

Example 3

A non-aqueous electrolyte secondary battery negative electrode material was prepared by the same procedure as in Example 1 except that γ-methacryloxypropyltrimethoxysilane (trade name KBM503 by Shin-Etsu Chemical Co., Ltd.) was used as the silane coupling agent. The negative electrode material thus obtained was a conductive powder having an average particle size of 4.4 μm, a BET specific surface area of 14.3 m²/g and a graphite coating weight of 27%.

As in Example 1, a test battery was fabricated using this conductive powder and similarly tested. The lithium ion secondary battery had a 1st cycle charge/discharge capacity of 1312 mAh/g, a 1st cycle discharge capacity of 1194 mAh/g, a 1st cycle charge/discharge efficiency of 91%, a 50th cycle discharge capacity of 1015 mAh/g, and a cycle retentivity of 85% after 50 cycles, indicating a high capacity and excellent cycle performance.

Example 4

A non-aqueous electrolyte secondary battery negative electrode material was prepared by the same procedure as in Example 1 except that a 5% hexane solution of hexamethyldisilazane was used as the surface treating agent. The negative electrode material thus obtained was a conductive powder having an average particle size of 3.7 μm, a BET specific surface area of 14.8 m²/g and a graphite coating weight of 23%.

As in Example 1, a test battery was fabricated using this conductive powder and similarly tested. The lithium ion secondary battery had a 1st cycle charge/discharge capacity of 1371 mAh/g, a 1st cycle discharge capacity of 1233 mAh/g, a 1st cycle charge/discharge efficiency of 90%, a 50th cycle discharge capacity of 962 mAh/g, and a cycle retentivity of 78% after 50 cycles, indicating a high capacity and excellent cycle performance.

Comparative Example 1

A non-aqueous electrolyte secondary battery negative electrode material was prepared by the same procedure as in Example 1 except that the silane coupling agent treatment was omitted. The negative electrode material thus obtained was a conductive powder having an average particle size of 4.8 μm, a BET specific surface area of 18.1 m²/g and a graphite coating weight of 21%.

As in Example 1, a test battery was fabricated using this conductive powder and similarly tested. The lithium ion secondary battery had a 1st cycle charge/discharge capacity of 1687 mAh/g, a 1st cycle discharge capacity of 1552 mAh/g, a 1st cycle charge/discharge efficiency of 92%, a 50th cycle discharge capacity of 775 mAh/g, and a cycle retentivity of 50% after 50 cycles, indicating inferior cycle performance to Example 1.

Comparative Example 2

A non-aqueous electrolyte secondary battery negative electrode material was prepared by the same procedure as in Example 2 except that the silane coupling agent treatment was omitted. The negative electrode material thus obtained was a conductive powder having an average particle size of 1.2 μm, a BET specific surface area of 23.1 m²/g and a graphite coating weight of 23%.

As in Example 1, a test battery was fabricated using this conductive powder and similarly tested. The lithium ion secondary battery had a 1st cycle charge/discharge capacity of 1182 mAh/g, a 1st cycle discharge capacity of 851 mAh/g, a 1st cycle charge/discharge efficiency of 72%, a 50th cycle discharge capacity of 832 mAh/g, and a cycle retentivity of 98% after 50 cycles, indicating a 1st cycle charge/discharge efficiency and cycle performance inferior to Example 2.

Using the non-aqueous electrolyte secondary battery negative electrode material of the invention as a lithium ion secondary battery negative electrode material, a lithium ion secondary battery having a high capacity and improved cycle performance is obtainable. The method of preparing the negative electrode material is simple and applicable to the industrial scale production.

Japanese Patent Application No. 2002-342624 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A negative electrode material for non-aqueous electrolyte secondary batteries, comprising:
a negative electrode active material containing a lithium ion-occluding and releasing material selected from the group consisting of (1) silicon particles having an average particle size of about 0.01 to 50 μm, (2) silicon oxide particles represented by the general formula $SiO_x$ wherein $1.0 \leq x < 1.6$ and having an average particle size of about 0.01 to 50 μm, (3) composite dispersion particles having an average particle size of about 0.01 to 50 μm where metallic silicon crystallites having an average particle size of about 1 to 500 nm are dispersed in a crystalline or amorphous silicon dioxide, and (4) mixtures thereof, wherein
the lithium ion-occluding and releasing material has been treated with an organosilicon base surface treating agent, and
the negative electrode active material is surface-coated with a conductive coating.

2. The negative electrode material of claim 1 wherein said organosilicon base surface treating agent is at least one member selected from the group consisting of a silane coupling agent or a (partial) hydrolytic condensate thereof, a silylating agent, and a silicone resin.

3. The negative electrode material of claim 1 wherein said conductive coating is a carbon coating.

4. The negative electrode material of claim 3 wherein the amount of carbon coating is 5 to 70% by weight of said negative electrode active material.

5. The negative electrode material of claim 1, wherein
said lithium ion-occluding and releasing material is metallic silicon particles having an average particle size of 3.5 μm and a BET specific surface area of 4 m²/g or a silicon oxide particles $SiO_{1.02}$ having an average particle size of 1.1 μm and a BET specific surface area of 10.3 m²/g, and
said surface treating agent is vinyltrimethoxysilane, γ-methacryloxypropyl-trimethoxysilane, or hexamethyldisilazane.

6. A negative electrode material for non-aqueous electrolyte secondary batteries, comprising:
a negative electrode active material containing a lithium ion-occluding and releasing material which has been treated with an organosilicon base surface treating agent is at least one member selected from the group consisting of a silane coupling agent of the general formula (1) or a (partial) hydrolytic condensate thereof, a silylating agent of the general formula (2), and a silicone resin of the general formula (3), $$R_{(4-n)}Si(Y)_n \qquad (1)$$

$$(R_mSi)_L(Y)_p \qquad (2)$$

wherein R is a monovalent organic group, Y is a hydrolyzable group or hydroxyl group, n is an integer of 1 to 4, p is an integer of 1 to 3, L is an integer of 2 to 4, and m is an integer of 1 to 3, $$R^1_q(R^2O)_rSiO_{(4-q-r)/2} \qquad (3)$$

wherein $R^1$ is hydrogen or a substituted or unsubstituted monovalent hydrocarbon group of 1 to 10 carbon atoms, $R^2$ is hydrogen or a substituted or unsubstituted monovalent hydrocarbon group of 1 to 6 carbon atoms, q and r each are 0 or a positive number satisfying $0 \leq q \leq 2.5$, $0.01 \leq r \leq 3$, and $0.5 \leq q+r \leq 3$,
wherein the negative electrode active material is surface-coated with a conductive coating.

7. A lithium ion secondary battery comprising the negative electrode material of claim 1 or 6 as a negative electrode active material.

* * * * *